UNITED STATES PATENT OFFICE.

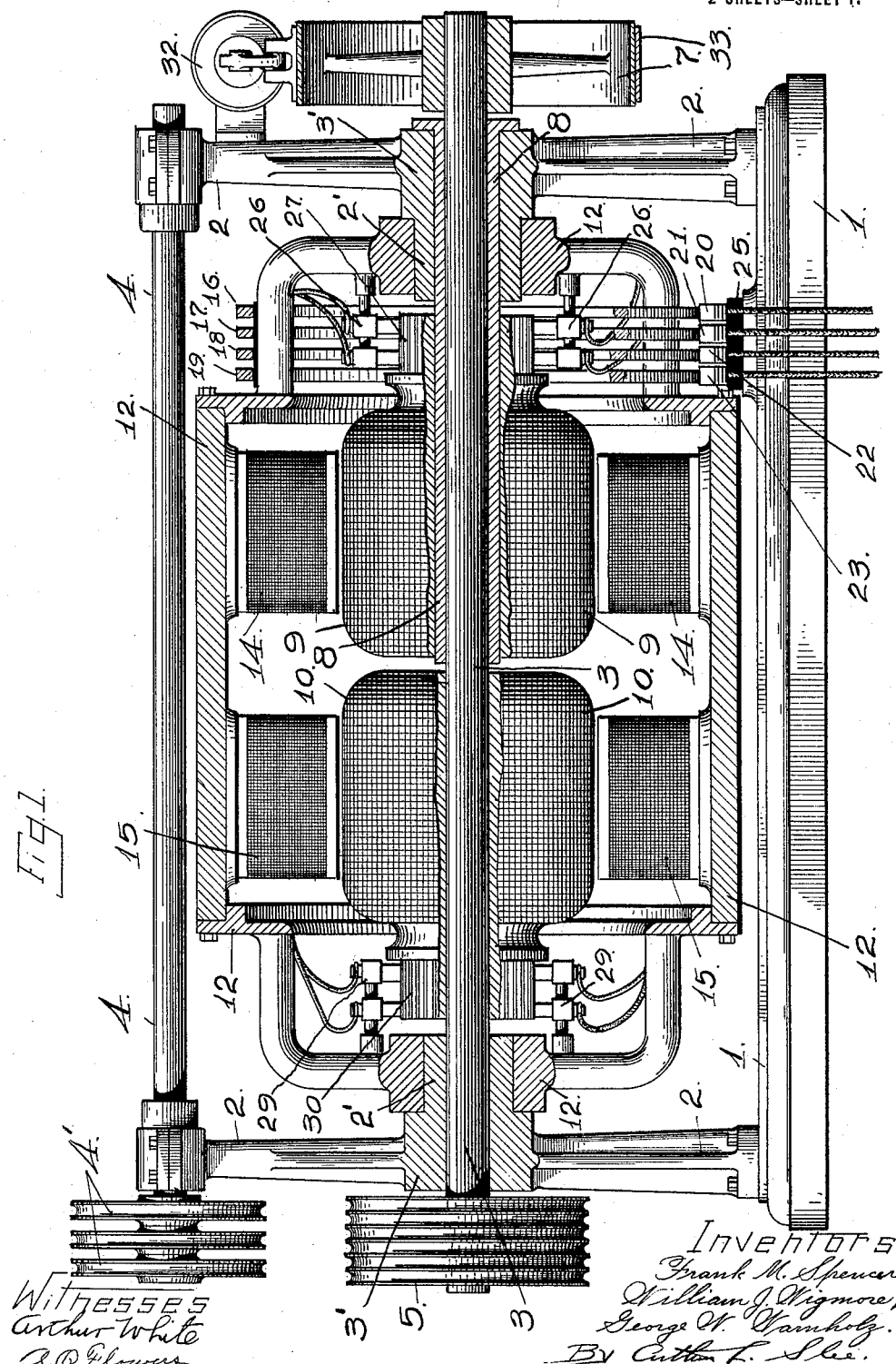

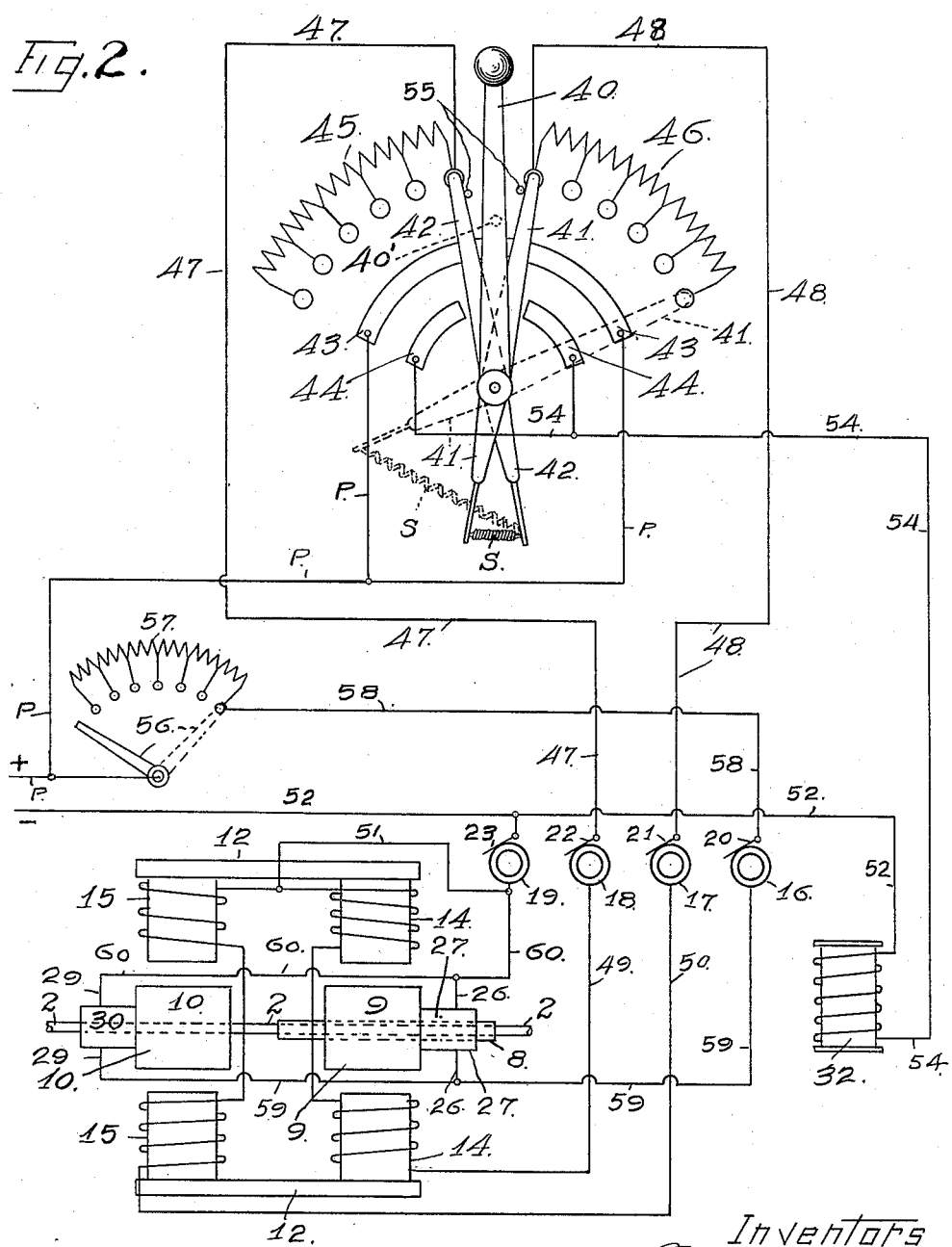

FRANK M. SPENCER AND GEORGE W. WARNHOLZ, OF SAN FRANCISCO, AND WILLIAM J. WIGMORE, OF OAKLAND, CALIFORNIA; SAID SPENCER AND SAID WIGMORE ASSIGNORS TO SAID WARNHOLZ.

REVERSIBLE ELECTRIC MOTOR.

1,149,601.   Specification of Letters Patent.   Patented Aug. 10, 1915.

Application filed January 28, 1913, Serial No. 744,789. Renewed January 11, 1915. Serial No. 1,710.

*To all whom it may concern:*

Be it known that we, FRANK M. SPENCER, GEORGE W. WARNHOLZ, and WILLIAM J. WIGMORE, citizens of the United States, residing the said FRANK M. SPENCER and GEORGE W. WARNHOLZ in the city and county of San Francisco, State of California, and the said WILLIAM J. WIGMORE in the city of Oakland, county of Alameda, State of California, have invented a new and useful Improvement in Reversible Electric Motors, of which the following is a specification.

Our invention relates to reversible electric motors wherein a stationary and a rotatable armature in multiple and in alinement with and secured to suitable driving mechanism, are influenced by separate electric exciting currents passing through the conductors in the field magnets which are secured together and which rotate freely around the said armatures and operate to rotate one of the armatures at various speeds and in either direction, and the objects of our invention are, first to provide a reversible motor wherein the current to the armature is constant; and second, to provide simple and improved means that are adapted to rotate suitable driving mechanism at various speeds in either direction by altering the strength of the exciting currents flowing through the conductors in the field magnets. The reversible motor hereinafter described may be used for driving any vehicle or machine where various speeds in either direction are required.

For a full and clear comprehension of our invention reference should be had to the drawings forming a part of the present specification, wherein like numerals of reference designate similar parts throughout the said specification and drawings and in which—

Figure 1 is a side elevation, partly in section, of our reversible motor, disclosing the manner in which the field magnets are rotatably mounted and secured together, the manner in which one of the armatures is held against rotation, the brake drum, band brake and solenoid for the release of the band brake, and the collector rings and armature brushes for carrying the current to the several parts. Fig. 2 is a diagram of an electric circuit disclosing the manner in which the current is carried to the several parts of the motor and the manner in which the said current is altered in order to produce various speeds in either direction.

The numeral 1 is used to designate a suitable base plate and 2 are suitable standards for the support of the drive shaft 3 which is rotatably mounted within suitable bearings 3' of the said standards 2. An idler shaft 4, having sheaves 4' secured to one end thereof, is rotatably mounted within suitable bearings at the top of the standards 2, while similar driving sheaves 5 are secured to one end of the driving shaft 3 and a brake drum 7 is secured to the other end thereof. A sleeve 8 is mounted upon one half of the driving shaft 3 and rigidly secured to one of the standards 2. An armature 9 is rigidly secured to the inner end of the sleeve 8 while a second armature 10 is keyed to the drive shaft 3 which is rotatably mounted in the bearings 3' of the standards 2. The standards 2 are provided with hollow cylindrical extension bearings 2' upon which are rotatably secured the bearings of a hollow cylindrical shell 12, which is adapted to rotate freely and independently of the armatures 9 and 10 but concentric therewith.

Secured to the internal periphery of the hollow shell 12, are two sets of field magnets 14 and 15 adapted to operate in the planes of the armatures 9 and 10 respectively. Also secured to one end of the rotatable shell 12 are the separately insulated collector rings 16, 17, 18 and 19 against which collector rings the separately insulated contact brushes 20, 21, 22 and 23, secured to the base plate 1, are held. Armature brushes 26 and 29, secured to the arms of the shell 12, are adapted to maintain proper contact with the commutators 27 and 30 of the armatures 9 and 10 respectively.

A solenoid 32 is secured to one of the standards 2 and operates to release the band brake 33 which normally engages and prevents the rotation of the brake drum 7, secured to one end of the drive shaft 3, through the medium of a suitable spring, not shown, in the usual manner.

A permanent field is maintained within the field magnets 14 and 15 in the following manner: Referring to Fig. 2 of the drawings, the current flows from the power line P to the contact 43 and from the said contact 43, through the contact arm 42, line 47, contact brush 22, collector ring 18, line 49, field magnets 14, return line 51, collector ring 19, contact brush 23 and thence to the negative wire 52 on the one hand and through the arm 41, line 48, contact brush 21, collector ring 17, line 50, field magnets 15, return line 51, collector ring 19, contact 23 and to the negative wire 52 on the other hand.

When it is desired to start the rotation of the shell 12, the arm 56 is moved into contact with the resistance 57 in the usual manner and gradually the said arm 56 is moved to the position shown in dotted lines, which permits the current to flow through the line 58, contact 20, collector ring 16, line 59, brushes 26 and 29, commutators 27 and 30 of the armatures 9 and 10 respectively opposite brushes 26 and 29, return line 60, collector ring 19, contact brush 23 and to the negative wire 52. The armatures 9 and 10 thus being connected in multiple, equal fluxes are produced in the two armatures, which, reacting with the flux of the field magnets, cause the shell to rotate, inasmuch as the armature 9 is held against rotation by the sleeve 8, and the armature 10, being keyed to the drive shaft 3, is held against rotation by the action of the spring, not shown, on the band brake 33 which engages the brake drum 7 secured to one end of the said shaft 3 as hereinbefore described.

When the operating lever 40 of the controller is moved to the left, a pin 40' secured to the back thereof, engages the arm 42 and moving the said lever 42 likewise to the left and against the tension of the spring S until it reaches the last pin of the resistance 45, connects the said resistance 45 into the field circuits of the magnets 14, thereby reducing the flow of current and consequently the number of lines of force generated within the said field. In order that the conductors of the armature 9 may cut the same number of lines of force within the field as formerly, the R. P. M. of the shell 12, to which the said field is secured, must be increased proportionately.

We will assume that the rotative influences between the armatures 9 and 10 and the field magnets 14 and 15 respectively are such as will cause the shell 12, to which the said magnets 14 and 15 are secured, to rotate at a speed of 100 R. P. M. the armature 9 being stationary and the armature 10 held against rotation by means of the band brake 33. We will also assume that the influence of the introduction of the resistance 45 into the field circuit of the magnets 14 is such that it will increase the speed of the shell 12, and consequently the field magnets 14 and 15, to 200 R. P. M. Then, the relative speed of the stationary armature 9 and the field magnets 14 being 200 R. P. M. and the relative speed of the armature 10 and the field magnets 15 being 100 R. P. M., the current through the magnets 15 not having been altered, the armature 10 must rotate 100 R. P. M. in a forward direction, the drum 7 of the shaft 3, to which the armature 10 is secured, having been released in the following manner.

Whenever the operating lever 40 is moved in either direction, a pin 40' secured to the back thereof, engages either the contact arm 41 or 42, according to the direction in which the said lever 40 is moved. Either contact arm 41 or 42 when moved from a vertical position, will establish electrical connection between the contact strip 43, which is connected to the power wire P and the contact 44, so that the current will flow from the said contact 43, arm 41 or 42 as the case may be, contact 44, line 54 to the solenoid 32 and thence to the return or negative wire 52. In this manner the solenoid 32 is energized and operates to release the band brake 33 from the drum 7, allowing the shaft 3 to rotate before the current can be weakened through either field magnet.

From the foregoing it is obvious that when the operating lever 40 is in a vertical position, the strength of the separate exciting currents through the field magnets 14 and 15 will be the same and the shell 12, to which the said magnets are secured, will rotate at 100 R. P. M. while the armature 10, which is keyed to the driving shaft 3, will be held stationary by means of the relative rotative influences and the action of the band brake. Also, when a certain resistance is introduced into the field magnets 14, the said magnets 14 and the shell to which they are secured will rotate at 200 R. P. M. while the armature 10 and the drive shaft 3 will rotate at 100 R. P. M.

If the operating lever 40 be moved to the right so that the contact arm 41 is moved to the position shown in dotted lines in Fig. 3, the resistance 46 will be introduced into the circuit of the field magnets 15 which will have the same effect on the said magnets 15 as hereinbefore described for the magnets 14, viz., the current flowing through the said magnets 15 will be altered and the relative speed of the armature 10 and the field magnets 15 will be 200 R. P. M.. But, the relative speed of the stationary armature 9 and the field magnets 14, which operate in electrical conjunction therewith, is only 100 R.

P. M. consequently, in order to maintain the relative speed of 200 R. P. M. between the armature 10 and the field magnets 15 the armature 10, and consequently the drive shaft 3 and sheaves 5, must rotate 100 R. P. M. in the opposite direction.

Briefly, the effect of altering the currents to either field magnet 14 or 15 may be stated in the following terms: (1) When the strength of the current flowing through both field magnets 14 and 15 is the same, the speed of the shell 12, to which both magnets 14 and 15 is secured, will be 100 R. P. M. inasmuch as the armature 9 is stationary and the armature 10 is held against rotation by means of the rotative influences between the said armature 10 and the field magnets 15, and the band brake 33. (2) When the operating lever is moved to the left, or when the resistance 45 is introduced into the field current of the magnets 14 the rotative influences will be altered so as to produce a speed of 200 R. P. M. between the stationary armature 9 and the field magnets 14. The relative speed of the armature 10 and the field magnet 15 still being 100 R. P. M. the said armature 10, which is keyed to the drive shaft 3, will be rotating at a speed of 100 R. P. M. in the same direction as that in which the shell 12 is rotating. (3) When the operating lever 40 is moved in a direction that will introduce the resistance 46 into the circuit of the field magnets 15 a relative speed of 200 R. P. M. will be established between the armature 10 and the said field magnet 15. But the relative speed of the field magnet 14, to the stationary armature 9 being 100 R. P. M. and the field magnets 14 and 15 being secured together by means of the said shell 12, the speed of the armature 10 will be 100 R. P. M. minus 200 R. P. M. which is 100 R. P. M. in the opposite direction.

It is obvious that the variable speed is obtained by increasing or decreasing the amount of the resistance to either field magnet.

The contact levers 41 and 42 are maintained or returned to their upper position against the stop pins 55 by the action of the spring S which is secured to the opposite ends of the said levers.

The details of construction being so susceptible to variation, we do not wish to confine ourselves to the precise construction shown herein, but rather to avail ourselves of any modification that may properly fall within the scope of our invention.

Having thus described our invention what we claim as new and desire to secure by Letters Patent is:

1. A reversible electric motor comprising a stationary and a rotatable armature in alinement; separately excited field magnets adapted to rotate around the armatures and to operate in electrical conjunction therewith; and means for altering the strength of the exciting currents in each field.

2. A reversible electric motor comprising a stationary and a rotatable armature in alinement; separately excited field magnets adapted to rotate around the armatures and to operate in electrical conjunction therewith; means for independently altering the strength of the exciting currents in each field; and means for holding the rotatable armature against rotation.

3. A reversible electric motor comprising a stationary and a rotatable armature in alinement; separately excited field magnets adapted to rotate around the armatures and to operate in electrical conjunction therewith; a controller adapted to introduce separate resistances into the current of each set of field magnets and independently of each other; means for preventing the rotation of the rotatable armature; and a suitable drive shaft rigidly secured to the said rotatable armature.

4. In a reversible electric motor the combination of a suitable base plate; parallel vertical standards having suitable bearings secured thereto; a suitable drive shaft having sheaves secured to one end thereof rotatably mounted within the bearings of the standards; a sleeve mounted upon the driving shaft and rigidly secured to one of the standards; an armature rigidly secured to the sleeve; a second armature rigidly secured to the drive shaft; duplicate field magnets secured to each other and adapted to rotate freely around the armatures secured to the sleeve and the drive shaft; and means for altering the strength of independent exciting currents flowing through the said duplicate field magnets.

5. In a reversible electric motor the combination of a suitable frame having standards with suitable bearings and hollow cylindrical extensions concentric with the said bearings; a drive shaft rotatably mounted within the bearings and having a brake drum rigidly secured to one end and suitable driving sheaves secured to the other end thereof; a sleeve mounted upon one end of the drive shaft and rigidly secured against rotation; an armature secured to the sleeve; a second armature secured to the drive shaft; a hollow cylindrical shell rotatably mounted upon the hollow cylindrical extensions of the bearings; duplicate sets of field magnets secured to the internal periphery of the hollow shell and adapted to operate in electrical conjunction with each armature; suitable electrical connections adapted to carry independent currents to each set of field magnets and a common current to the armatures; a solenoid magnet secured to the frame; a band brake surrounding the brake drum on the shaft and adapted to be released by the action of the solenoid magnet; and a controller adapted to alternately introduce separate resistances into the current flowing through the field magnets and to energize the solenoid simultaneously with the introduction of either resistance into either set of the field magnets.

In witness whereof we hereunto set our signatures in the presence of two subscribing witnesses.

FRANK M. SPENCER.
GEORGE W. WARNHOLZ.
WILLIAM J. WIGMORE.

Witnesses:
ARTHUR WHITE,
JAMES F. McCUE.

Copies of this patent may be obtained for five cents each, by addressing the "Commissioner of Patents, Washington, D. C."